Nov. 2, 1943.                R. C. KEPNER                2,333,255
                              CASTER TRUCK
                          Filed March 5, 1942
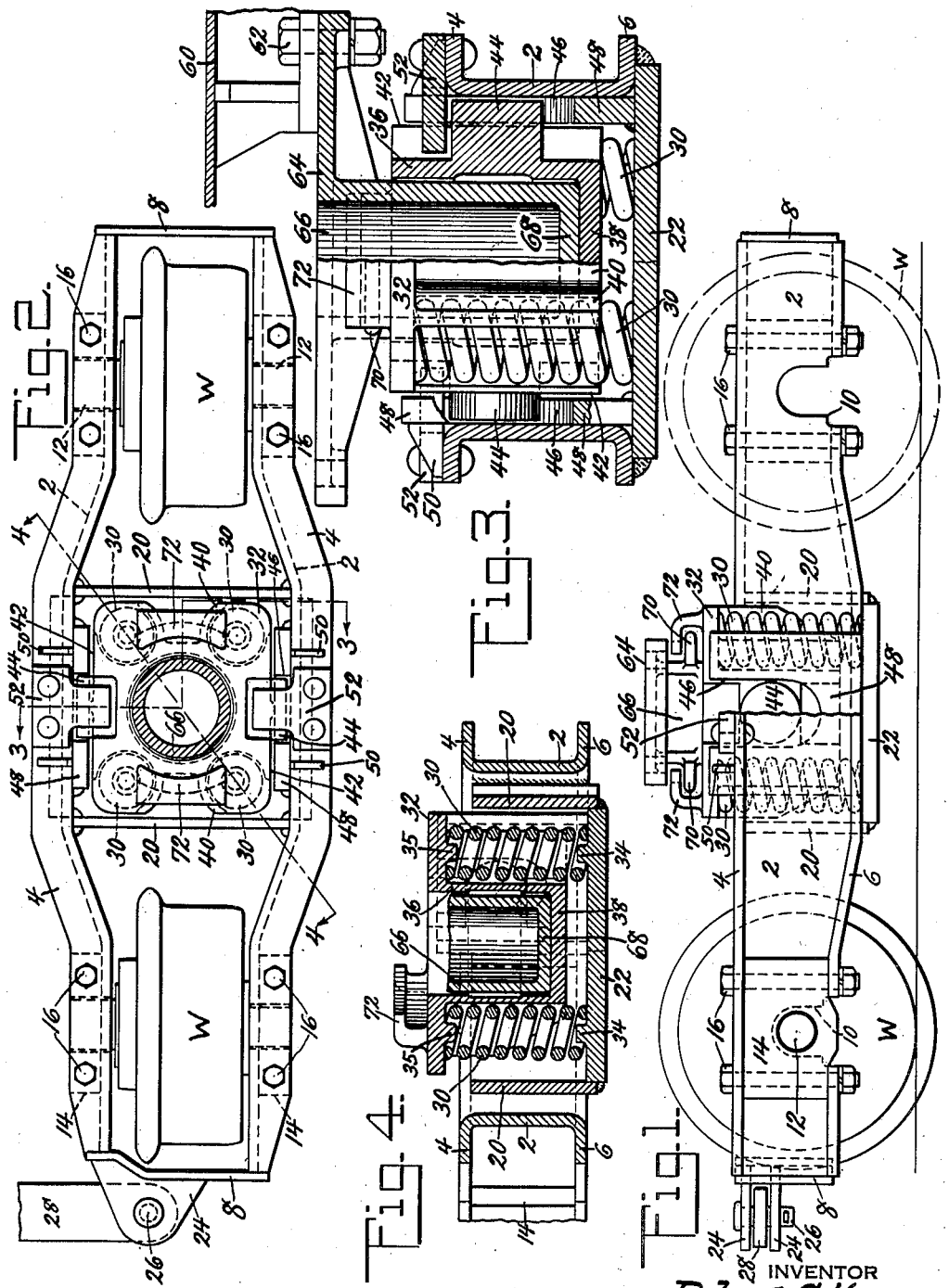
INVENTOR
Robert C. Kepner
BY
Donald U. Rich
ATTORNEY Patented Nov. 2, 1943

2,333,255

UNITED STATES PATENT OFFICE 2,333,255

CASTER TRUCK

Robert C. Kepner, Bloomsburg, Pa., assignor to American Car and Foundry Company, New York, N. Y., a corporation of New Jersey Application March 5, 1942, Serial No. 433,501

6 Claims. (Cl. 105—179)

This invention relates to trucks in general and in particular to caster trucks for use under mine or other industrial cars traveling over irregular road beds.

In recent years haulage requirements have necessitated the increase in capacity of mine and industrial cars to the point where the conventional four wheel type of car can no longer be used. In most cases it is impossible to use the more or less standard type of railway truck since clearances and roughness of road bed prevent their use. The majority of mine and industrial trackage is poorly laid, resulting in extremely irregular track in both the vertical and the horizontal directions. Such irregularities require trucks which are extremely flexible and can follow both the horizontal and the vertical irregularities of the track and with a minimum transmission of strain to the car body. It is an object, therefore, of the present invention to provide a caster truck which can readily follow all irregularities in the track.

A further object of the invention is the provision of a caster truck for resiliently supporting the car body and which truck will follow all irregularities in the track whether in a vertical or in a horizontal direction.

A still further object of the invention is the provision of a caster truck having a spring mounted center bowl about which the truck frame may oscillate in a vertical direction under control of the springs.

A yet further object of the invention is the provision of a caster truck frame having a center bowl spring mounted thereon for oscillatory and vertical sliding movements.

These and other objects of the invention will be apparent to persons skilled in the art from a study of the following description and accompanying drawing, in which:

Fig. 1 is a side view of the improved truck with part of the frame broken away to better disclose the construction;

Fig. 2 is a plan view of the improved truck;

Fig. 3 is a sectional view taken substantially on line 3—3 of Fig. 2, and

Fig. 4 is a sectional view taken substantially on line 4—4 of Fig. 2.

Referring now to the drawing in detail, it will be seen that the truck is of the stub axle type and may be mounted in any position desired in order to support the car body, but preferably the trucks will be mounted under the four corners of the body as shown in Joy Patent 2,271,195. As clearly shown, the truck frame is of rigid construction with the sides formed of pressed channels having webs 2 and outwardly directed top and bottom flanges 4 and 6 respectively. These channels are placed in spaced back to back relation and rigidly tied together at their ends by cross plates 8 securely welded or otherwise secured to the webs and flanges. Adjacent the ends of the channel form side frames the lower flange and part of the web are cut away as at 10 in order that the axle 12 may be dropped out of the frame. The frame is supported upon the axles by means of bearing blocks 14 fastened in place by bolts or other means 16 extending through the blocks and through the upper and lower flanges of the side frames. These bearing blocks not only support the truck on the axle ends, but more than compensate for the metal removed from the side frames, thus strengthening the frames at the axle zone. The axles are held in place by the bearing blocks and can be removed by taking out bolts 16 and pulling the blocks 14 off the axle ends after which the axle and supporting wheel W may be dropped out of the frame. Intermediate the axle areas of the truck the side frames are bent so as to provide a widened central portion for accommodation of the special floating center bowl or bearing. The widened portions of the truck side frames are rigidly tied together by vertically extending plates 20 welded or otherwise secured to the side frame webs and to a bottom plate 22. This bottom plate is rigidly secured by welding or other means to the bottom flanges of the side frames as well as to the lower edges of the vertically extending tie plates 20. Thus it will be seen that the truck side frames are rigidly tied together adjacent their ends and adjacent the center by an upwardly open box like portion, thereby producing an extremely strong truck frame. As shown in Figs. 1 and 2, one of the end plates 8 has secured thereto spaced plates 24 adapted to receive a pin 26 extending therethrough and through a tie bar 28 which will extend across the car and be connected to the end plate of a similar truck on the opposite side of the car. This tie bar can, of course, be attached to the truck side frames at other points as is well known in the art.

The upwardly open box like central portion of the truck not only rigidly ties the truck frame together, but also serves to receive the special floating truck center bowl which is mounted on four springs 30 resting at their lower ends on the bottom plate 22 and bearing at their upper ends upon the under side of the rim 32 of the floating center bowl. Lugs 34 and 35 are formed on the bottom plate and center bowl rim respectively to retain the springs in position and prevent their kicking to one side. The floating center bowl is formed with the top plate or rim 32, just referred to, from which depends the cup like projection 36 having a heavy bottom or end 38. The rim and cup like projection are connected together by buttressing walls 40 which are curved to conform to the springs, as best shown in Figs.

2 and 3. On the sides of the center bowl, which will be located adjacent the truck side frames, the buttressing walls are of full depth and widened so as to produce flat surfaces 42 to guide and control the vertical movements of the center bowl. Trunnions 44 are formed integral with the side buttressing ribs and extend outwardly for vertically guided movement in upwardly open slots 46 cut or otherwise formed in center bowl guide plates 48. These plates are rigidly secured by means, such as welding, to the webs of the side frames and to the bottom plate 22 and, as clearly shown in Figs. 2 and 3, they extend above the side frames and have the upper extensions buttressed by small plates 50 welded or otherwise secured to the guide plates and to the top flanges of the truck frame. The springs 30 are preferably assembled and placed under a slight precompression, after which retaining lugs 52 are riveted or otherwise secured in position upon the top flanges of the truck side frames and extend inwardly above the trunnions 44, thus holding the floating center bowl and springs in position. The car body, a portion of which is indicated at 60 in Fig. 3, has rigidly connected thereto by means of bolts 62 a body carried center bearing 64. This body carried center bearing is formed with a hollow depending projection 66 closed at its bottom by an end wall 68 adapted to bear upon the bottom wall 36 of the floating truck center bowl. The hollow projection 66 is formed with a discontinuous rib 70 adapted to be engaged beneath the lugs 72 formed on the upper surface of the floating truck center bowl rim 32. By making the rib 70 discontinuous the entire truck assembly may be locked upon the body carried center bearing or pin 66 merely by raising the truck into position and then rotating through ninety degrees to its final running position.

From the preceding description it will be seen that the extremely rigid truck frame is supported on wheels arranged in tandem and with the truck frame carried on a truck center bowl which floats upon the springs 30. Lateral thrusts imparted from the truck to the body will be transmitted through the surfaces 42 and guide plates 48, while fore and aft thrusts caused by braking will be transmitted to the body by the trunnions 44. Rotation of the truck in a horizontal plane is permitted through relative rotation between the floating truck center bowl and the rigid body center pin. Vertical swinging or oscillation of the truck may take place at any position of the truck, being permitted by the trunnions 44 and by the compression or extension of springs 30. In other words, the vertical movements of the truck will be controlled by the springs 30 which resiliently support the car body and the degree of control will depend upon the load in the car, that is, a light car will more readily permit vertical oscillation of the truck than will a heavily loaded car.

While the invention has been described more or less in detail by specific reference to one form thereof, it will be obvious that other forms and modifications will suggest themselves to persons skilled in the art and all such added forms and modifications are contemplated as fall within the scope of the appended claims defining my invention.

What is claimed is:

1. A caster truck assembly comprising, side pieces supported on spaced wheels and axles, a plurality of tie pieces rigidly connecting said side pieces together intermediate said wheels and axles and forming with said side pieces an upwardly open box like structure, springs located within said box like structure adjacent each corner thereof, and a floating center bowl supported on said springs for controlled rocking movement relative to said side pieces.

2. A caster truck assembly comprising, side pieces supported on spaced wheels and axles, a plurality of tie pieces rigidly connecting said side pieces together intermediate said wheels and axles and forming with said side pieces an upwardly open box like structure, springs located within said box like structure adjacent each corner thereof, and a floating center bowl supported on said springs for controlled rocking movement relative to said side pieces, said center bowl being formed with a depending cup like central portion located between said springs and adapted to receive a rigid body post.

3. A caster truck assembly comprising, side pieces supported on spaced wheels and axles, a plurality of tie pieces rigidly connecting said side pieces together intermediate said wheels and axles and forming with said side pieces an upwardly open box like structure, resilient means located within said box like structure, a floating center bowl supported on said resilient means for vertical and rocking movements, laterally projecting trunnions formed on said center bowl, and guide plates secured to said side pieces and formed with elongated slots for guiding said trunnions.

4. A caster truck assembly comprising, side pieces supported on spaced wheels and axles, a plurality of tie pieces rigidly connecting said side pieces together intermediate said wheels and axles and forming with said side pieces an upwardly open box like structure, resilient means located within said box like structure, a floating center bowl supported on said resilient means for vertical movements relative to the side pieces, and means to guide the vertical movements of said center bowl, said means being so formed and arranged as to allow rocking movements of said center bowl upon said resilient means.

5. As an article of manufacture, a floating center bowl for car trucks comprising an upwardly open cup like central portion adapted to receive a car pivot post, a rim substantially surrounding the top edge of said central portion and formed integral therewith, and buttressing ribs connecting said rim and central portion, said ribs being shaped to receive and at least partially house resilient supporting means.

6. As an article of manufacture, a floating center bowl for car trucks comprising an upwardly open cup like central portion adapted to receive a car pivot post, a rim substantially surrounding the top edge of said central portion and formed integral therewith, buttressing ribs connecting said rim and central portion and shaped to receive resilient supporting means, and oppositely disposed trunnions extending laterally outward from certain of said ribs and about which said bowl may rock.

ROBERT C. KEPNER.